United States Patent
Simpson, Sr.

[11] Patent Number: 6,109,362
[45] Date of Patent: Aug. 29, 2000

[54] HAND GRADER

[76] Inventor: David W. Simpson, Sr., 3381 East Rd., Loxahatchee, Fla. 33470

[21] Appl. No.: 09/087,119

[22] Filed: May 29, 1998

Related U.S. Application Data

[60] Provisional application No. 60/066,413, Nov. 24, 1997.

[51] Int. Cl.[7] .................................................. A01B 1/00
[52] U.S. Cl. ........................ 172/375; 37/285; 7/114
[58] Field of Search ................................ 172/375, 371; 294/49, 54.5, 55; 37/266, 278, 284, 285; D8/1, 10, 45; 15/245, 236.01, 236.02; D32/46, 49; 7/114, 116, 169, 170

[56] References Cited

U.S. PATENT DOCUMENTS

| | | |
|---|---|---|
| Re. 6,419 | 5/1875 | Johnson . |
| D. 291,273 | 8/1987 | Vosbikian .................................. D8/10 |
| D. 360,342 | 7/1995 | Shea ........................................... D8/10 |
| D. 391,815 | 3/1998 | Venezio ..................................... D8/13 |
| D. 408,696 | 4/1999 | Simpson, Sr. ............................... D8/1 |
| 1,202,791 | 10/1916 | Brownstein . |
| 2,347,963 | 5/1944 | O'Neill ..................................... 15/245 |
| 2,443,602 | 6/1948 | Clark ........................................ 15/157 |
| 3,465,457 | 9/1969 | Stone ........................................ 37/53 |
| 3,727,964 | 4/1973 | Novdvik ..................................... 294/54 |
| 3,782,770 | 1/1974 | Lee ............................................ 294/49 |
| 3,952,812 | 4/1976 | Lucan ...................................... 172/375 |
| 4,597,204 | 7/1986 | Heiden ...................................... 37/285 |
| 5,048,883 | 9/1991 | Waluk ................................. 294/54.005 |
| 5,465,510 | 11/1995 | Goodenough et al. ................... 37/285 |
| 5,676,413 | 10/1997 | Hauck .................................... 294/54.5 |

*Primary Examiner*—Thomas B. Will
*Assistant Examiner*—Nathan Mammen
*Attorney, Agent, or Firm*—Quarles & Brady, LLP

[57] ABSTRACT

A multi-purpose hand tool, comprising: first, second, third and fourth flat rectangular sections connected edgewise to one another in succession and having a cross-section defining a concave side, the first and fourth sections being outer sections and the second and third sections being inner sections with respect to the concave cross-section; and, a handle attached to and extending perpendicularly from one of the inner sections, outwardly from the concave side, whereby the sections form a multi-purpose grading blade that can be used for pushing, pulling, smoothing and tamping. The first and second sections are attached at a first angle in a range of 15° to 30°, the second and third sections are attached at a second angle in a range of 30° to 50° and the third and fourth sections are attached at a third angle in a range of 30° to 50°.

21 Claims, 2 Drawing Sheets

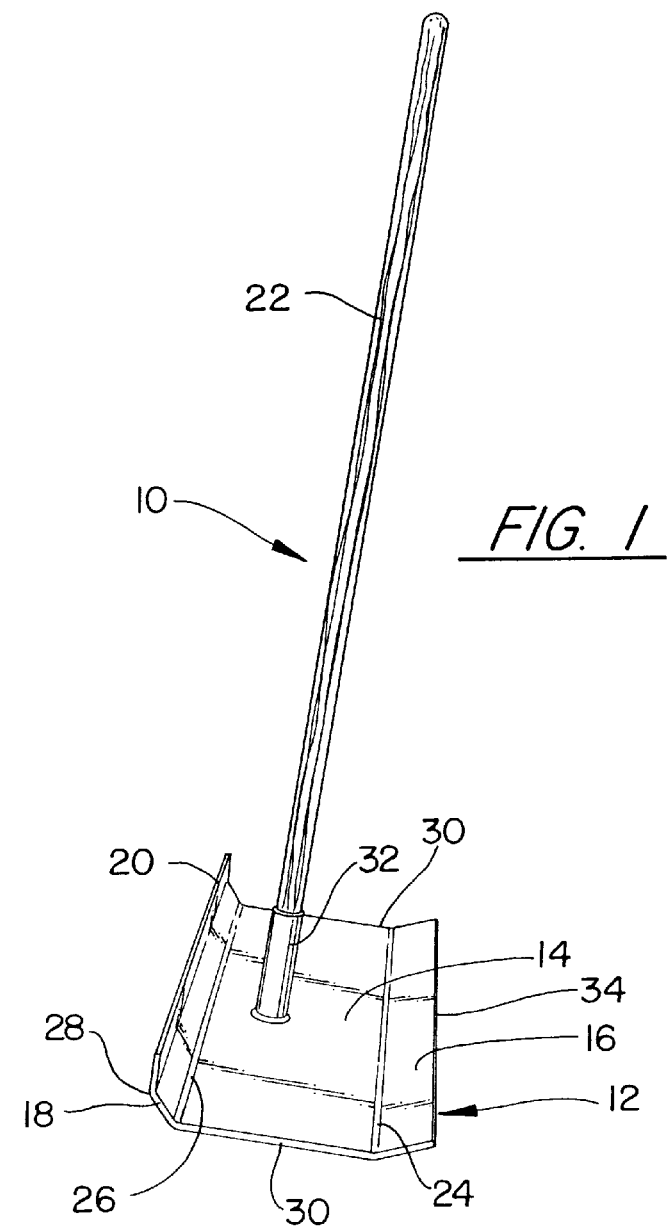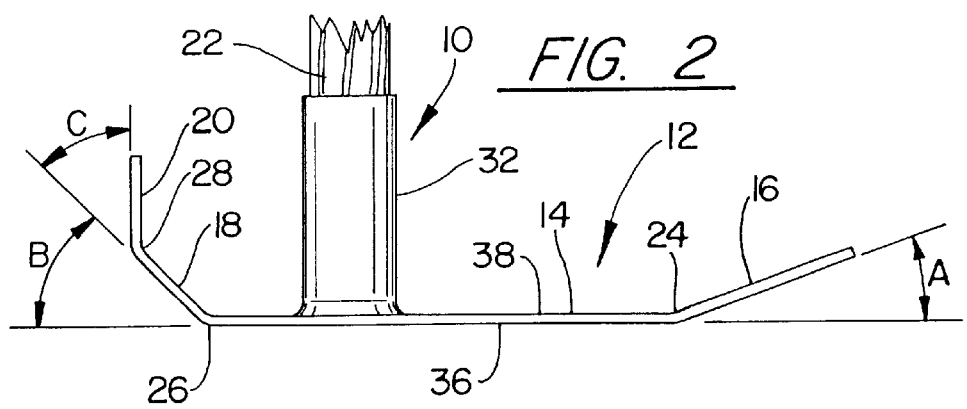

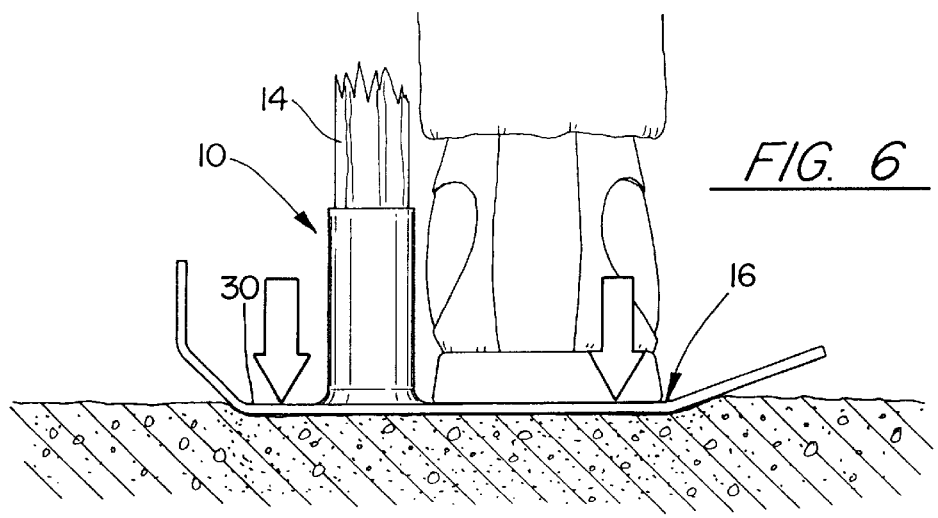
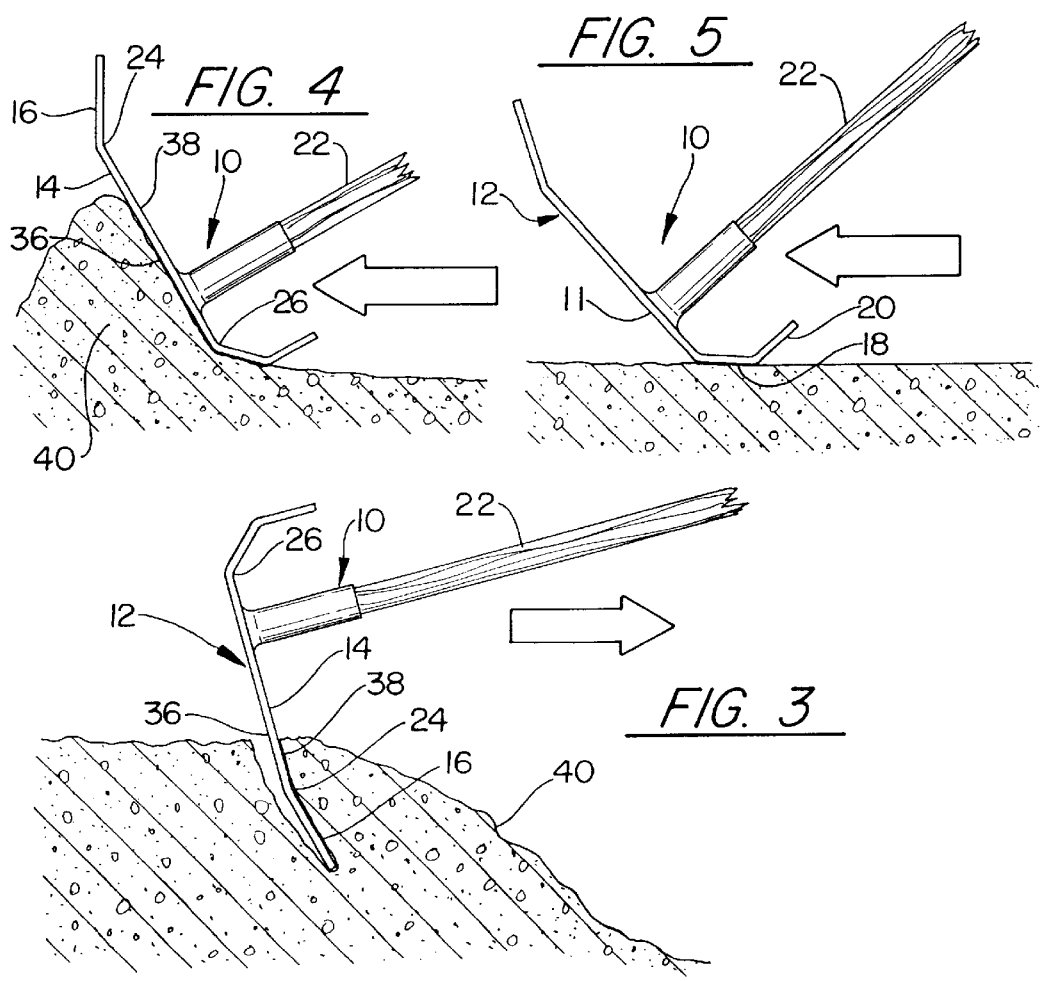

HAND GRADER

CROSS REFERENCE TO RELATED APPLICATIONS

This is a continuation of copending provisional application Ser. No. 60/066,413, filed Nov. 24, 1997.

BACKGROUND OF THE INVENTION

1. Field of the Invention

This invention relates to material moving tools. More particularly, this invention relates to a hand-held grader specifically adapted to push, pull, smooth, scrape, and tamp material.

2. Description of Related Art

Hand-held tools for moving material were among the very first tools ever invented, and since those first tools, mankind has been continually adapting and improving them to meet various needs. As such, today's hand-held material moving tools have been specifically designed for particular needs and for particular materials such as earth, snow, mulch, gravel, and asphalt cold patch mix. For example, a shovel is shaped differently depending upon whether earth or snow is to be moved. Also, though shovels are well adapted at lifting material, shovels are not as effective tamping, pushing or pulling material.

Another example of a hand-held material moving tool is a hoe. A hoe is effective at pushing and pulling material, but is a narrow tool which cannot move much material at once. Moreover, a hoe is not well adapted for smoothing the material because the thin lower edge of the hoe tends to dig into the material.

A situation that illustrates how hand-held material moving tools have become so specialized is when earth has been removed to create a hole and the earth now has to be reintroduced into the hole. To most effectively move the earth into the hole, a tool such as a shovel or hoe needs to be used. Once the hole is filled, the earth needs to be tamped using a tamping tool. Finally, to smooth the earth around the hole, a smoothing tool is required. Thus, the simple job of filling the hole, tamping the earth, and then smoothing the earth requires three different tools.

SUMMARY OF THE INVENTION

It is an object of this invention to provide a hand-held material moving tool specifically adapted to push, pull, smooth, scrape, and tamp material such as earth, snow, mulch, gravel, concrete and asphalt cold patch mix.

Another object of this invention is to provide a hand-held material moving tool that can be stored standing up without the need for additional support.

Still another object of this invention is to provide a handheld material moving tool that, when not in use, can be placed unattended in an upright position so that the user of the tool does not have to perform the ergonomically unsound task of bending over to pick up the tool.

A hand grader, in accordance with an inventive arrangement, comprises: first, second and third flat sections forming a multi-purpose blade having a cross-section defining a concave side; and, a handle attached to the blade, extending perpendicularly from one of the flat sections and outwardly from the concave side, whereby the hand grader can be used for pushing, pulling, smoothing and tamping.

The one of the first, second and third sections to which the handle is attached has a first pair of opposite edges to which the other two of the first, second and third sections are respectively edgewise attached at respective angles defining the concave cross-section.

The blade can comprise a fourth flat section attached edgewise to one of the other two of the first, second and third sections at a respective angle.

The one of the sections to which the handle is attached has a second pair of opposite edges, the handle advantageously being in a position substantially centered between the second pair of opposite edges and closer to one of the other two of the first, second and third sections.

The first and second sections are attached at a first angle, the second and third sections are attached at a second angle and the third and fourth sections are attached at a third angle, the handle being advantageously attached to the second section and extending substantially parallel to a plane defined by the fourth section.

The first and second sections are attached at a first angle, the second and third sections are attached at a second angle and the third and fourth sections are attached at a third angle, a sum of the second and third angles advantageously being approximately 90°.

The first and second sections can be attached at a first angle, the second and third sections can be attached at a second angle and the third and fourth sections can be attached at a third angle, the first angle advantageously being in a range of 15° to 30°, the second and third angles advantageously being in a range of 30° to 50 and a sum of the second and third angles advantageously being approximately 90°.

In a presently preferred embodiment, the first and second sections are attached at a first angle of approximately 20°, the second and third sections are attached at a second angle of approximately 45° and the third and fourth sections are attached at a third angle of approximately 45°.

With respect to dimensions perpendicular to the respective attached edges, the first section is 3–5 inches in length, the second section is 1–3 inches in length and each of the third and fourth sections is ½–2 inches in length. In a presently preferred embodiment, the first section is 4¼ inches in length, the second section is 1¾ inches in length and each of the third and fourth sections is 1 inch in length.

A multi-purpose hand tool, in accordance with another inventive arrangement, comprises: first, second, third and fourth flat rectangular sections connected edgewise to one another in succession and having a cross-section defining a concave side, the first and fourth sections being outer sections and the second and third sections being inner sections with respect to the concave cross-section; and, a handle advantageously attached to and advantageously extending perpendicularly from one of the inner sections, outwardly from the concave side, whereby the sections form a multi-purpose grading blade that can be used for pushing, pulling, smoothing and tamping.

The one of the inner sections to which the handle is attached has a first pair of opposite edges to which other ones of the sections are respectively attached and a second pair of opposite edges to which none of the other sections are attached, the handle being in a position substantially centered between the second pair of opposite edges and closer to one of the edges of the first pair.

The first and second sections can be attached at a first angle, the second and third sections can be attached at a second angle and the third and fourth sections can be attached at a third angle, the handle advantageously being attached to the second section and advantageously extending substantially parallel to a plane defined by the fourth section.

The first and second sections can be attached at a first angle, the second and third sections can be attached at a second angle and the third and fourth sections can be attached at a third angle, a sum of the second and third angles advantageously being approximately 90°.

The first and second sections can be advantageously attached at a first angle in a range of 15° to 30°, the second and third sections can be advantageously attached at a second angle in a range of 30° to 50°, the third and fourth sections can be advantageously attached at a third angle in a range of 30° to 50°, and a sum of the second and third angles advantageously being approximately 90°.

In a presently preferred embodiment, the first and second sections are attached at a first angle of approximately 20°, the second and third sections are attached at a second angle of approximately 45° and the third and fourth sections are attached at a third angle of approximately 45°.

With respect to dimensions perpendicular to the respective attached edges, the first section is 3–5 inches in length, the second section is 1–3 inches in length and each of the third and fourth sections is ½–2 inches in length. In a presently preferred embodiment, the first section is 4¼ inches in length, the second section is 1¾ inches in length and each of the third and fourth sections is 1 inch in length.

BRIEF DESCRIPTION OF THE DRAWINGS

Presently preferred embodiments of the inventive arrangements are shown in the drawings, it being understood, however, the inventive arrangements are not limited to the precise arrangements and instrumentalities shown.

FIG. 1 is a perspective view of a hand grader according to the inventive arrangements.

FIG. 2 is a side elevation of a FIG. 1.

FIG. 3 is a side elevation of a hand grader oriented to pull earth.

FIG. 4 is a side elevation of a hand grader oriented to push earth.

FIG. 5 is a side elevation of a hand grader oriented to smooth earth.

FIG. 6 is a side elevation of a hand grader oriented to tamp earth.

DETAILED DESCRIPTION OF THE PREFERRED EMBODIMENTS

FIGS. 1 and 2 illustrate a hand grader 10 according to the invention. The hand grader 10 comprises a blade or blade assembly 12 and a handle 22 attached to the blade assembly. The blade assembly 12 comprises a first flat rectangular section 14, second flat rectangular section 16, third flat rectangular section 18, and fourth flat rectangular section 20. The blade can also be extruded, for example form aluminum. The blade assembly 12 can either be manufactured from a single piece of material or from several pieces of material. If several pieces of material are used, any method of joining the sections that provides a joint capable of withstanding the stress of pushing, pulling, scraping, and tamping earth is acceptable.

The second section 16 extends from a lower edge 24 of the first section 14. The second section 16 is also at a first angle A relative to the plane created by the first section 14 and in a direction towards the handle 22. The third section 18 extends from an upper edge 26 of the first section 14. The third section 18 is also at a second angle B relative to the plane created by the first section 14 and in a direction towards the handle 22. The fourth section 20 extends from a third edge 28 of the third section 18. The fourth section 20 is also at a third angle C relative to the plane created the third section 18 and in a direction towards the handle 22.

Depending upon the material to moved by the hand grader 10 and other relevant factors, the first angle is preferably between 15° and 30°, the second angle is preferably between 30° and 50°, and the third angle is preferably 30° to 50°. In the presently preferred embodiment of the invention the first angle is 20°, the second angle is 45°, and the third angle is 45°.

The sections 14, 16, 18, 20 are preferably composed from strong, corrosion-resistant materials, for example plastic or aluminum or stainless steel. Alternatively, the blade can be made form carbon steel, which is strong, and relatively inexpensive, which is coated with a corrosion resistant material, for example paint or powder coat. The individual sections 14, 16, 18, 20 can also either be composed of different materials or from a single type of material. For example, the second section 16 can be composed of material that has greater wear-resistant properties than the other sections. One reason for this configuration is that in certain operations, scraping for example, the second section 16 is exposed to greater wear than the other sections.

The sections 14, 16, 18, 20 are preferably rectangular; however, the invention is not limited in this manner. Rectangular sections 14, 16, 18, 20 are preferable because if the blade assembly 12 is constructed from one piece of material, the material is more easily bent along straight lines which are characteristic of rectangles. Also, even if the blade assembly 12 is constructed from several pieces, the separate pieces are more easily joined along straight edges. Another reason why rectangular sections 14, 16, 18, 20 are preferred is that straight edges produce a better surface when smoothing.

The dimensions of the sections 14, 16, 18, 20 in the blade assembly 12 vary depending upon the application in which the hand grader 10 is to be used and the material the hand grader 10 is to move. In the presently preferred embodiment of the invention, the lateral dimension of each and every section 14, 16, 18, 20 is sixteen inches. Vertical dimensions can be in the following ranges: approximately 3–5 inches for the first section; 1–3 inches for the second section; and, ½–2 inches for each of the third and fourth sections. In the presently preferred embodiment, the vertical dimension of the first section is 4¼ inches, the vertical dimension of the second section is 1¾ inches and the vertical dimension of each of the third and fourth sections is 1 inch. It should be noted, however, that the invention is not limited to these specific dimensions.

Any method of attaching the handle 22 to the first section 14 is acceptable. Examples of acceptable methods are welding the handle 22 to the first section 14 or using a fastener, such as a screw or nail, to connect the handle 22 to the first section 14. The presently preferred method of connecting the handle 22 to the first section 14 is to use an attachment element 32. The presently preferred attachment element 32 is a pipe that has been welded to the first section 14. The pipe should have an internal diameter that is very close to the external diameter of the handle 22. The handle 22 is then inserted into the attachment element 32. Once inserted into the attachment element 32, any means of preventing the handle 22 from being removed from the attachment element 32 is acceptable. Examples include force fitting the handle 22 into the attachment element 32 or using a fastener, such as a screw, to prevent the handle 22 from being removed.

The handle 22 is preferably made from a strong and lightweight material. Handles 22 are commonly known in the art of hand-held material moving tools and any material used in such handles that are strong and lightweight are acceptable. Examples of such material are wood or fiberglass and certain metals, for example aluminum. The length of a handle 22 is dependent upon the application in which the hand grader 10 is being used and the size of hand grader 10, but determining the length of a handle 22 using the previously mentioned factors is well known in the art of hand-held material moving tools. Thus, this invention is not limited as to the length of the handle 22.

The handle 22 is preferably centered laterally on and perpendicular to the first section 14; however, the invention is not limited in this manner. Advantageously, by centering the handle 22 laterally on the first section 14 the tendency of the blade assembly 12 to twist laterally will be decreased. Otherwise, if the handle 22 is located adjacent one of the side edges 30, the blade assembly 12 will tend to twist laterally which will change the direction in which the earth 40 is to be moved. With earth moving operations, being able to direct the earth 40 to an exact location is important. Thus, preventing lateral twisting of the blade assembly 12 is desired.

Positioning the handle 22 perpendicular to the first section 14 is preferable for several reasons. When the hand grader 10 is used for tamping, as shown in FIG. 7, force is exerted downward more efficiently when the handle 22 is perpendicular to the earth 40. Otherwise, if the handle 22 was not perpendicular relative to the earth 40, a component of the force exerted along the handle 22 will not be exerted downward, but instead, in a sideways direction. Also, when the hand grader 10 is being stored in a free-standing position, as shown in FIG. 7, if the handle 22 is excessively angled away from perpendicular, the weight of the handle 22 will tip over the hand grader 10. Thus, such an orientation prevents the hand grader 10 from being stored in a free-standing position.

Additionally, if the handle 22 is angled towards the fourth section 20, such an orientation prevents the hand grader 10 from using the fourth section 20 as a surface to smooth earth 40. This is because the free end of the handle 22 would contact the earth 40 before the blade assembly 12 could be tipped over enough to have the front face 36 of the fourth section 20 could contact the earth. Also, this limits the stroke back and forth of a person using the hand grader 10.

If the handle 22 is angled towards the first section 16, such an orientation limits the amount of earth 40 which could otherwise be pulled as shown in FIG. 3 in a single stroke. The reason is that as handle 22 angles towards the first and second sections 14, 16 the area between the sections becomes smaller. Thus, less earth 40 is moved with each stroke.

The angling of the handle 22 towards either of the side edges 30 is also not preferable. If the handle 22 is angled toward either of the side edges 30, the blade assembly 12 will tend to twist laterally which will change the direction in which the earth 40 is to be moved. As stated previously, being able to direct the earth 40 to an exact location is important. Thus, preventing lateral twisting of the blade assembly 12 is desired. Therefore, for all the reasons stated above, the handle 22 is preferably orientated perpendicular to the first section 14.

The handle 22 is preferably attached to the first section 14 adjacent the upper edge 26; however, the invention is not limited in this manner. The advantages of locating the handle 22 in such a position are numerous. When the hand grader 10 is being used to pull earth 40, as shown in FIG. 3, by placing the handle 22 far away from the second section 16, the blade assembly 12 can be thrust deeper into the earth 40. Thus, more earth 40 can be moved with a single pull. Otherwise, if the handle is attached to the first section 14 near the lower edge 24 or in the middle of the lower and upper edges 24, 26, during insertion of the blade assembly 12 the handle 22 would impact the earth 40 and prevent the blade assembly 12 from being completely inserted into the earth 40.

An advantage of attaching the handle 22 adjacent the upper edge 26 of the first section 14 is that such a position allows a foot to be fully placed on the rear face 38 of the first section 14. This allows the user of hand grader 10 to exert additional force upon the blade assembly 12. Such additional force may be useful when the hand grader 10 is used in a tamping operation, as shown in FIG. 6, or used to push material, as shown in FIG. 4. Otherwise, if the handle 22 was attached in the middle of the first section 14, the area in which the foot could be placed on the rear face 38 of the first section 14 would be reduced nearly by one-half which could hamper exertion of force upon the blade assembly 12 by a foot.

Still another advantage of attaching the handle 22 to the first section 14 adjacent the upper edge 26 is that such a position provides better leverage during certain operations. In operations such as pushing, as shown in FIG. 4, and smoothing, as shown in FIG. 5, the forces exerted by the earth 40 on the blade assembly 12 and by the handle on the blade assembly 12 are in close proximity. Because the forces are in close proximity, the moment created by these forces on the blade assembly 12 are minimized. Thus, in the situation where the hand grader 10 is being pushed or pulled and the force exerted by the earth 40 on the blade assembly 12 is suddenly increased, for example because of a stone or hard piece of earth, the blade assembly 12 will not rotate because moment on blade assembly 12 has been minimized. However, if the handle 22 is attached closer to the lower edge 26, the moment created by the forces on the blade assembly 12 becomes greater. Thus, when the force exerted by the earth 40 on the blade assembly 12 suddenly increases, the blade assembly 12 will rotate, and rotation is not desired because portions of the blade assembly 12 will disengage from the earth 40.

FIG. 3 illustrates the hand grader 10 orientated so as to pull earth 40. The blade assembly 12 is thrust downward so that a cutting edge 34 of the second section 16 enters into the earth 40 first. As the handle 22 is pulled backward, earth 40 builds up on the rear face 38 of the first and second sections 14, 16 and is pulled in the direction of the arrow.

FIG. 4 illustrates the hand grader 10 orientated so as to push earth 40. As the handle 22 is pushed forward, earth 40 builds up on the front face 38 of the first and second sections 14, 16 and is pushed in the direction of the arrow.

FIG. 5 illustrates the hand grader 10 orientated so as to smooth earth 40 in a forward direction. The positioning of the third section 18 allows the blade assembly 12 to rest on the earth 40 without embedding into the earth 40. This is because the weight of the hand grader 10 is spread out over a greater area than if the hand grader 10 was resting on just an edge. By having a large surface upon which the hand grader's 10 weight, the hand grader 10 can smooth the earth 40 without digging into the earth 40. The fourth section 18 can also be used to rest the weight of the hand grader 10 when the hand grader 10 is used to smooth earth 40.

The hand grader 10 can also smooth earth 40 in a rearward direction, opposite to the arrow in FIG. 5. When the hand grader 10 is pulled in a rearward direction and the hand grader's weight is supported by the third section 18, the fourth section 20 advantageously prevents the blade assembly 12 from digging into the earth 40 because the fourth section 20 points upward. If the fourth section 20 was not present, the third edge 28 would tend to dig into the earth 40, and this would prevent the hand grader 10 from effectively smoothing the earth 40 in a rearward direction.

FIG. 6 illustrates the hand grader 10 orientated so as to tamp earth 40. The hand grader 10 is positioned so that the first section 14 is positioned parallel to the earth 40. Once positioned, downward force is applied to the handle 22 to tamp the earth 40. Additional force can be applied by stepping on the rear face 38. FIG. 6 also illustrates the hand grader 10 in what is otherwise an unattended free-standing position. Thus, when the operator needs the hand grader 10, the operator does not need to bend down to pick up the hand grader 10. Also, by being freestanding, the hand grader 10 can be stored upright without the need for additional support or a bracket.

What is claimed is:

1. A hand grader, comprising:

first, second and third flat sections forming a multi-purpose blade having a cross-section defining a concave side said blade comprising a substantially corrosion resistant material; and, a handle attached to said blade, extending perpendicularly from one of said flat sections and outwardly from said concave side, said one of said first, second and third sections to which said handle is attached having a first pair of opposite edges to which the other two of said first, second and third sections are respectively edgewise attached at respective angles defining said cross-section, said handle being attached to said section at a position spaced from each of said first pair of opposite edges, whereby said hand grader can be used for pushing, pulling, smoothing and tamping.

2. The hand grader of claim 1, wherein said blade comprises a fourth flat section attached edgewise to one of said other two of said first, second and third sections at a respective angle.

3. The hand grader of claim 2, wherein said one of said sections to which said handle is attached has a second pair of opposite edges, said handle being in a position substantially centered between said second pair of opposite edges and closer to one of said other two of said first, second and third sections.

4. The hand grader of claim 1, wherein said one of said sections to which said handle is attached has a second pair of opposite edges, said handle being in a position substantially centered between said second pair of opposite edges and closer to one of said other two of said first, second and third sections.

5. The hand grader of claim 2, wherein said first and second sections are attached at a first angle, said second and third sections are attached at a second angle and said third and fourth sections are attached at a third angle, said handle being attached to said second section and extending substantially parallel to a plane defined by said fourth section.

6. The hand grader of claim 2, wherein said first and second sections are attached at a first angle, said second and third sections are attached at a second angle and said third and fourth sections are attached at a third angle, a sum of said second and third angles being approximately 90°.

7. The hand grader of claim 2, wherein said first and second sections are attached at a first angle, said second and third sections are attached at a second angle and said third and fourth sections are attached at a third angle, said first angle being in a range of 15° to 30°, said second and third angles being in a range of 30° to 50° and a sum of said second and third angles being approximately 90°.

8. The hand grader of claim 2, wherein said first and second sections are attached at a first angle of approximately 20°, said second and third sections are attached at a second angle of approximately 45° and said third and fourth sections are attached at a third angle of approximately 45°.

9. The tool of claim 2, wherein with respect to dimensions perpendicular to said respective attached edges, said first section is 3–5 inches in length, said second section is 1–3 inches in length and each of said third and fourth sections is ½–2 inches in length.

10. The tool of claim 7, wherein with respect to dimensions perpendicular to said respective attached edges, said first section is 3–5 inches in length, said second section is 1–3 inches in length and each of said third and fourth sections is ½–2 inches in length.

11. The tool of claim 9, wherein with respect to dimensions perpendicular to said respective attached edges, said first section is 4¼ inches in length, said second section is 1¾ inches in length and each of said third and fourth sections is 1 inch in length.

12. The tool of claim 8, wherein with respect to dimensions perpendicular to said respective attached edges, said first section is 4¼ inches in length, said second section is 1¾ inches in length and each of said third and fourth sections is 1 inch in length.

13. A multi-purpose hand tool, comprising:

first, second, third and fourth flat rectangular sections connected edgewise to one another in succession and having a cross-section defining a concave side, said first and fourth sections being outer sections and said second and third sections being inner sections with respect to said concave cross-section, said flat rectangular sections comprising a substantially corrosion resistant material; and, a handle attached to and extending perpendicularly from one of said inner sections, outwardly from said concave side, said one of said inner sections to which said handle is attached having a first pair of opposite edges to which other ones of said sections are respectively attached and a second pair of opposite edges to which none of said other sections are attached, said handle being in a position substantially centered between said second pair of opposite edges and spaced from each of said edges of said first pair, whereby said sections form a multi-purpose grading blade that can be used for pushing, pulling, smoothing and tamping.

14. The tool of claim 13, wherein said first and second sections are attached at a first angle, said second and third sections are attached at a second angle and said third and fourth sections are attached at a third angle, said handle being attached to said second section and extending substantially parallel to a plane defined by said fourth section.

15. The tool of claim 13, wherein said first and second sections are attached at a first angle, said second and third sections are attached at a second angle and said third and fourth sections are attached at a third angle, a sum of said second and third angles being approximately 90°.

16. The tool of claim 13, wherein said first and second sections are attached at a first angle, said second and third sections are attached at a second angle and said third and fourth sections are attached at a third angle, said first angle being in a range of 15° to 30°, said second and third angles being in a range of 30° to 50° and a sum of said second and third angles being approximately 90°.

17. The tool of claim 13, wherein said first and second sections are attached at a first angle of approximately 20°, said second and third sections are attached at a second angle of approximately 45° and said third and fourth sections are attached at a third angle of approximately 45°.

18. The tool of claim 13, wherein with respect to dimensions perpendicular to said respective attached edges, said first section is 3–5 inches in length, said second section is 1–3 inches in length and each of said third and fourth sections is ½–2 inches in length.

19. The tool of claim 18, wherein with respect to dimensions perpendicular to said respective attached edges, said first section is 4¼ inches in length, said second section is 1¾ inches in length and each of said third and fourth sections is 1 inch in length.

20. The tool of claim 16, wherein with respect to dimensions perpendicular to said respective attached edges, said first section is 3–5 inches in length, said second section is 1–3 inches in length and each of said third and fourth sections is ½–2 inches in length.

21. The tool of claim 17, wherein with respect to dimensions perpendicular to said respective attached edges, said first section is 4¼ inches in length, said second section is 1¾ inches in length and each of said third and fourth sections is 1 inch in length.

* * * * *

UNITED STATES PATENT AND TRADEMARK OFFICE
CERTIFICATE OF CORRECTION

PATENT NO. : 6,109,362
DATED : August 29, 2000
INVENTOR(S) : Simpson, Sr.

Page 1 of 1

It is certified that error appears in the above-identified patent and that said Letters Patent is hereby corrected as shown below:

Column 2,
Line 29, replace "50" with -- 50° --.

Column 3,
Line 57, replace "form" with -- from --.

Column 4,
Line 6, after "created", insert -- by --.
Line 8, before "moved", insert -- be --.
Line 18, replace "form" with -- from --.

Column 7,
Line 23, replace "freestanding" with -- free-standing --.

Signed and Sealed this

Twelfth Day of March, 2002

Attest:

JAMES E. ROGAN
*Director of the United States Patent and Trademark Office*

*Attesting Officer*